United States Patent [19]

Staudinger

[11] Patent Number: 4,678,041
[45] Date of Patent: Jul. 7, 1987

[54] FIRE FIGHTING SERVICE VEHICLE

[75] Inventor: Hermann Staudinger, Neuhofen, Austria

[73] Assignee: Konrad Rosenbauer KG., Leonding, Austria

[21] Appl. No.: 711,617

[22] Filed: Mar. 14, 1985

[30] Foreign Application Priority Data

Mar. 16, 1984 [DE] Fed. Rep. of Germany ....... 3409807

[51] Int. Cl.[4] .......................... B60P 3/00; B62D 63/02; A62C 27/20
[52] U.S. Cl. ...................................... 169/24; 152/416; 180/24.08; 180/291; 239/172; 280/6 H; 296/37.6; 296/147; 303/91
[58] Field of Search ........................... 169/24; 239/172; 303/91; 180/291, 24.08; 280/6 H; 296/147, 37.6; 152/416

[56] References Cited

U.S. PATENT DOCUMENTS

| 1,623,830 | 4/1927 | Cropp | 296/147 |
| 1,988,671 | 1/1935 | Stout | 152/416 |
| 2,352,379 | 6/1944 | Geertz | 169/24 |
| 2,354,300 | 7/1944 | Bock | 180/24.08 X |
| 2,855,064 | 10/1958 | McCullough | 180/291 |
| 3,210,116 | 10/1965 | Chieger | 296/37.6 |
| 3,659,870 | 5/1972 | Okuyama | 280/6 H X |
| 3,711,162 | 1/1973 | Steinbrenner et al. | 303/91 |
| 3,884,496 | 5/1975 | Ito et al. | 280/6 H X |
| 4,350,354 | 9/1982 | Dotti et al. | 280/6 H |
| 4,421,151 | 12/1983 | Stumpe | 152/416 X |

Primary Examiner—Andres Kashnikow
Attorney, Agent, or Firm—Kurt Kelman

[57] ABSTRACT

A fire truck comprises an uninterrupted chassis frame carrying a driver's cab and supported on four driving axles arranged in 8×8 configuration and driven independently. The driving axles support the chassis frame via pressure fluid springs at opposite sides of the vehicle, the forward and rearward pairs of axles and associated springs defining forward and rearward undercarriages and the chassis carrying quenching agent tanks, a quenching agent pump, and a driving engine. The fluid pressure springs at one side of the vehicle are connected via a pressure fluid supply system and a load compensator system to the springs at the opposite side. An automatic transmission is positioned between the forward and rearward undercarriages and the driving axles are individually coupled thereto. The automatic transmission is coupled to the driving engine which is situated in the chassis frame above the rear undercarriage.

22 Claims, 16 Drawing Figures

FIRE FIGHTING SERVICE VEHICLE

FIELD OF THE INVENTION

The invention relates to a service vehicle carrying tanks of extinguishing fluid, in particular being an airport fire-fighting tanker, comprising an uninterrupted chassis frame which is supported on several driving axles driven independently of each other by a driving engine via springing or suspension devices, comprising an extinguishing fluid pump and a driver's cab situated thereon.

DESCRIPTION OF THE PRIOR ART

Service vehicles and in particular airport fire-fighting tankers have already become known—corresponding to the PUMA airport fire-fighting tanker manufactured by the applicants—which are equipped with an uninterrupted chassis frame. This is supported via suspension means on several driving axles driven independently of each other by a driving engine. Extinguishing fluid tanks, an extinguishing fluid pump and a driver's cab are installed on the chassis frame. The service vehicle has three driving axles, one driving axle forming the front undercarriage, and two driving axles forming the rear undercarriage. The central engine for the drive to the wheels and for the extinguishing fluid pump is installed in a frame section of the chassis frame which overhangs rearwards from the rear driving axle of the rear undercarriage and over the same. An extinguishing fluid tank is situated above the front driving axle of the rear undercarriage and another extinguishing fluid tank is situated between the two undercarriage units. The extinguishing fluid pump is situated between the extinguishing fluid tank last referred to and the front undercarriage.

A driver's cab projects from above the front undercarriage and over the front undercarriage in the direction of travel. An extinguishing fluid cannon is situated on the roof of the driver's cab. Such service vehicles proved to be most satisfactory particularly as airport fire-fighting tanker vehicles but improvements have been found necessary to enable them to fulfil the demands made on them for example in use at large airports.

OBJECTS AND SUMMARY OF THE INVENTION

An object of the present invention is to provide a service vehicle, and in particular an airport fire-fighting tanker vehicle, with which it is possible to carry at high speed a maximum store of quenching agent or of different quenching agents to the point of application and to fight a fire effectively, as far as possible from one central location.

It is a further object to make possible the adaptation of the vehicle rapidly to varying environmental conditions, in particular as between driving on metalled roads and runways, or cross-country, and to be capable of reaching maximum cornering speeds on metalled roadways.

According to the invention there is provided a service vehicle for use as a fire-fighting tanker vehicle comprising an uninterrupted chassis frame carrying a driver's cab and which is supported via springing means by several driving axles driven independently of each other by a driving engine, and having a quenching agent tanks and a quenching agent pump arranged thereon in which four driving axles are carried on the chassis frame via pressure fluid springs at opposite sides of the vehicle and the pressure fluid springs associated with wheels at one side are connected via a pressure fluid supply system and a load compensator system to the pressure fluid springs associated with wheels situated at the other side of the vehicle, an automatic transmission being situated between front and rear undercarriages each comprising two driving axles, the driving axles of each undercarriage being separately coupled to automatic transmission which is coupled to the driving engine situated on the chassis frame above the rear undercarriage.

Preferably an internal tire volume of each of the wheels of the driving axles is connected via a tire pressure regulator system to the pressure fluid supply system and that each internal tire volume has a respective associated regulator valve in the tire pressure regulator system whereby it is possible not only to adapt the position of the chassis frame or its distance from the wheel support surface, but also to the traction and driving conditions, or to reduce tire wear at high driving speeds by increasing the tire pressure.

The invention includes a service vehicle comprising a chassis frame supported via spring means by several axles carrying wheels, the axles being carried on the chassis frame by spring means comprising pressure fluid springs at opposite sides of the vehicle, the pressure fluid springs at one side being connected via a pressure fluid supply system and a load compensator system to the pressure fluid springs associated with the wheels at the other side, an internal tire volume of each of the wheels being connected to the pressure fluid supply system via a tire pressure regulator system, each internal tire volume being associated with a respective regulator valve in the tire pressure regulator system, the wheels, the tire pressure control system comprising relay valves and tire pressure control valves which may be acted upon via separately operated control valves, the tire pressure control valves being placed on the wheels and are equipped with respective shut-off elements which interrupts the passage through the piping system between the internal tire volume and the associated relay valve via the control valve, and which has limit means adapted automatically to interrupt if the pressure drops below a minimum tire inflation pressure.

The invention further includes a service vehicle comprising a chassis frame supported via spring means by several axles carrying wheels, respective disc brakes being associated with each of the wheels, the axles being arranged as a front undercarriage and a rear undercarriage and the disc brakes associated with a driving axle of the front undercarriage and of a driving axle of the rear undercarriage are coupled with an anti-locking valve of an anti-lock braking system, each disc brake of the two undercarriages having allocated to it a rotation transmitter of which output terminals are connected to the input terminals of the anti-locking valve which is also connected to operating cylinder for the corresponding disc brakes.

The invention yet further includes a service vehicle for use as a fire-fighting tanker vehicle comprising an uninterrupted chassis frame carrying a driver's cab and which is supported via springing means by several driving axles driven independently of each other by a driving engine, and having quenching agent tanks and a quenching agent pump arranged thereon in which four driving axles are carried on the chassis frame via pressure fluid springs at opposite sides of the vehicle and the pressure fluid springs associated with wheels at one side are connected via a pressure fluid supply system and a load compensator system to the pressure fluid springs associated with wheels situated at the other side of the vehicle and in which each of the driving axles is supported in the area of each of the longitudinal bearers of the chassis frame via pairs of pressure fluid spring means which are arranged one behind another in the direction of travel and that an axle casing is supported via two longitudinal links arranged in the area of the two longitudinal bearers and one longitudinal link positioned between them and via two transverse links arranged parallel to the driving axle, each of which extends between a central region of the driving axle and a respective one of the longitudinal bearers.

The invention furthermore includes a service vehicle for use as a fire-fighting tanker vehicle comprising an uninterrupted chassis frame carrying a driver's cab and which is supported via springing means by several driving axles driven independently of each other by a driving engine, and having quenching agent tanks and a quenching agent pump arranged thereon in which four driving axles are carried on the chassis frame via pressure fluid springs at opposite sides of the vehicle and the pressure fluid springs associated with wheels at one side are connected via a pressure fluid supply system and a load compensator system to the pressure fluid springs associated with wheels situated at the other side of the vehicle, an automatic transmission being situated between front and rear undercarriages each comprising two driving axles and in which measurement senders associated with the pressure fluid springs and one longitudinal bearer are coupled via a load equaliser device with the measurement senders, which are associated with the pressure fluid springs at the oppositely situated longitudinal bearer, the measurement senders situated between one driving axle of an undercarriage and the one longitudinal bearer being coupled to the measurement senders situated between the other driving axle of the undercarriage and the other longitudinal bearer via lines to a comparator stage of the load equaliser device.

BRIEF DESCRIPTION OF THE DRAWINGS

The invention will now be described, by way of example, with reference to the accompanying partly diagrammatic drawings, in which.

DETAILED DESCRIPTION OF THE PREFERRED EMBODIMENT

Figure 1:
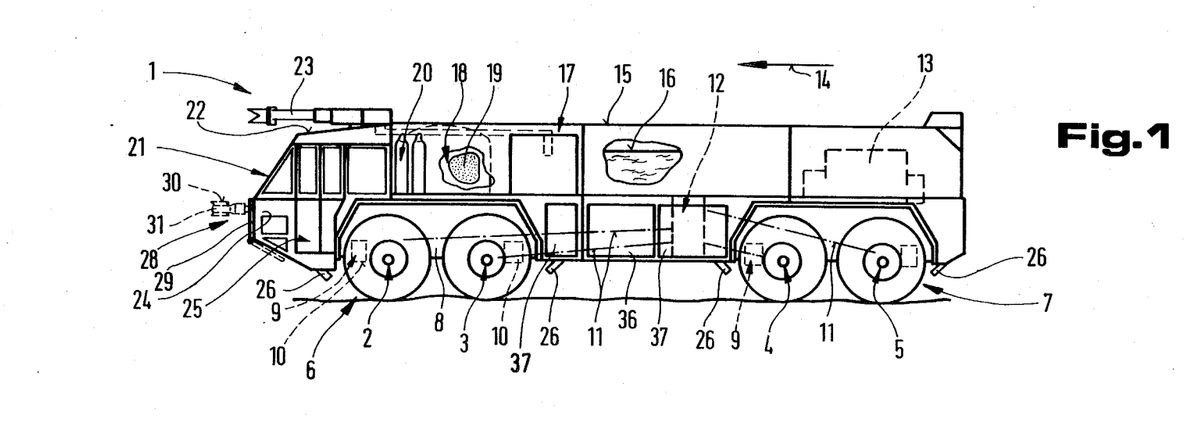
FIG. 1 is a side elevation of a service vehicle according to the invention.

An airport fire-fighting tanker service vehicle 1 as seen in FIG. 1 and comprises four driving axles 2 to 5. The front driving axles 2,3 are assembled into a front sub-chassis or undercarriage 6 and the driving axles 4,5 being assembled into a rear subchassis or undercarriage 7.

A chassis frame 8 is supported on the driving axles 2 to 5 via suspension means 9 which are formed by pressure fluid spring means 10. Each of the driving axles 2 to 5 is coupled via respective drive shafts 11 to an automatic gearbox 12 installed between the front and rear undercarriages 6 and 7. The automatic gearbox 12 is coupled to a driving engine 13 which is mounted on the chassis frame 8 above the rear undercarriage 7. A quenching agent tank 15 is mounted on the chassis frame 8 next to the driving engine 13 forwardly in the direction of travel—arrow 14—and between the two undercarriages 6 and 7. The quenching agent tank 15 serves to receive a liquid quenching agent 16, e.g. water. A quenching agent pump 17 for the liquid quenching agent 16 is installed between the front and rear undercarriages 6 and 7. A quenching agent tank 18 for pulverulent quenching agent 19 and a propellant gas system 20 for ejection of the pulverulent quenching agent, are provided on the chassis frame 8 above the front undercarriage 6. A driver—s cab 21 is arranged at a forward end of the chassis 8 and to project beyond the front driving axle 2 of the front undercarriage 6. A quenching agent cannon 23, in particular for liquid or foamlike quenching agents 16, is installed on a roof 22 of the cab 21. An inwardly folding door 25 is installed in a sidewall 24 of the driver—s cab 21. Floor spray nozzles 26 are provided in the region of the driving axles 2 to 5, to secure intrinsic protection for the airport fire-fighting tanker vehicle 1.

Figure 2:
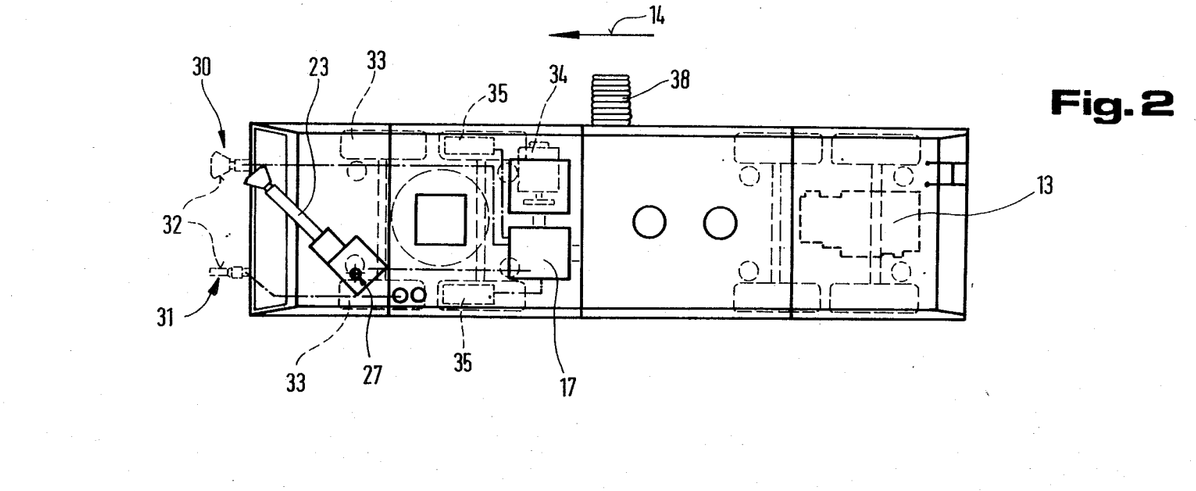
FIG. 2 is a plan view of the service vehicle of FIG. 1.

As more clearly apparent from FIG. 2, the quenching agent cannon 23 is pivotable transversely of the direction of travel—arrow 14—around a pivot spindle 27. Furthermore, two quenching agent cannons 30,31 may be swung out from a forward end side 28 closeable by means of a flap 29—FIG. 1—into an operational position 32 shown by broken lines in FIGS. 1 and 2. As seen in FIG. 2 each driving axle 2-5 is equipped with wheels 33 each carrying one tire. The quenching agent pump 17 is coupled direct to a drive motor 34 separate from the driving motor 13 providing the motive power. Foaming agent tanks 35 are additionally installed above the front undercarriage 6.

Implement compartments 36,37—see FIG. 1—are situated between the front and rear undercarriages 6,7 and laterally with respect to the chassis 8. Hose reels 38, FIG. 2, allowing for mobile utilisation of a heavy foam monitor, for example, are mounted in the compartment 36 and may be swung out, as shown diagrammatically in FIG. 2. Life-saving apparatus, compressed air respirators, pressure hoses and complementary quenching agents, such as a BCF system, may be provided in the other implement compartments 37. It is possible to mount the hydraulic system for controlling and displacing the quenching agent cannon 23 in these implement compartments, so that the system may be driven in an uncomplicated manner by the automatic transmission 12 via an intermediate gear.

Figure 3:
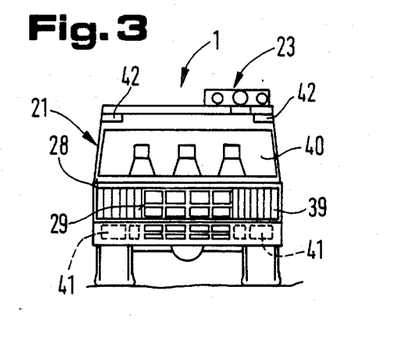
FIG. 3 is an end view of the service vehicle of FIG. 1 from the rear or right hand of that figure.

As shown in FIG. 3 two independently movable flaps 29,39 are provided at the forward end 28 of the driver's cab 21, and are situated below a windscreen 40 and above headlamps 41. Signalling or warning lights 42 are integrated in the cab superstructure in the roof area.

Figure 4:
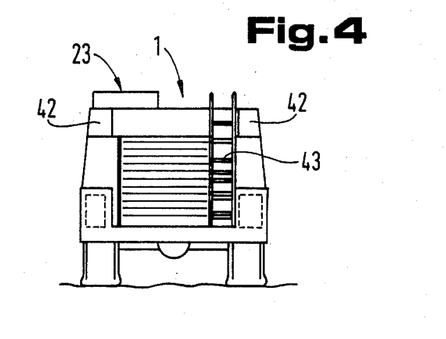
FIG. 4 is an end view of the service vehicle according to FIG. 1 from the front or left-hand of that figure.

As shown in FIG. 4 provision for access to the roof of the airport fire-fighting tanker vehicle 1 is made by a stern side ladder 43 situated beside cooling areas or ventilation grids for ventilation of the driving motor which are centrally arranged in the stern area. Signalling or warning lights 42 are again integrated in the areas of transition between the roof and sidewalls of the stern superstructure.

Figure 5:
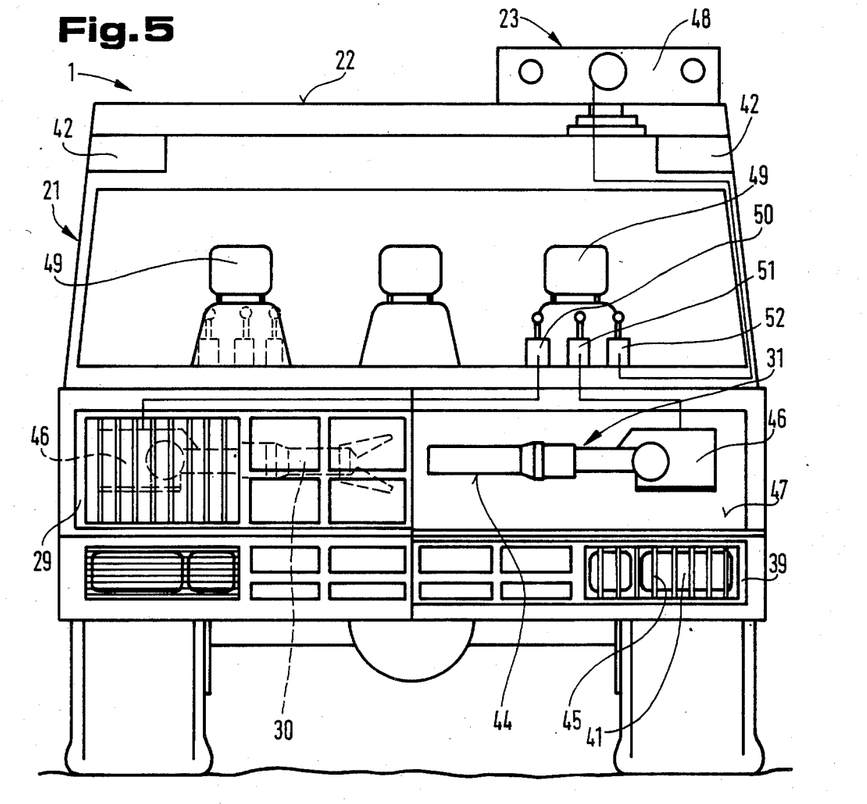
FIG. 5 is an end view of the service vehicle corresponding to FIG. 3 but to an enlarged scale and in which a quenching agent cannon situated in the end side of the driver—s cab is extended.

As shown to enlarged scale in FIG. 5 in the forward end of the airport fire-fighting tanker vehicle 1, the flap 39 being opened, the quenching agent cannon 31 situated in an idle or stored position 44 is exposed to view. As additionally apparent, the flap 39 has a grating 45 in the area of the headlamps 41, so that the beam of the headlamps 41 is substantially unaffected when the flap 39 is open. The quenching agent cannon 31 is suitably connected to the propellant gas system 20 for ejection of pulverulent quenching agent as denoted diagrammatically in FIG. 2 by chain-dotted lines. Control over the quenching agent cannon 31 is provided by means of an electrical servodrive 46 which is mounting in the housing 47 situated behind the flap 39. The quenching agent cannon 30 situated behind the flap 29 is connected to the quenching agent pump 17 and is similarly equipped with an electrical servo-drive 46 for vertical and lateral displacement with respect to the driver's cab 21. The quenching agent cannon 23 on the roof 22 of the driver's cab 21 is vertically and laterally displaceable by means of a hydraulic servo-drive 48. Control elements 50-52 for controlling the separate quenching agent cannons 23,30 and 31, are situated within reach of seats 49 of the driver's cab 21. As indicated by broken lines, duplicate control elements may also be situated in front of the other seats 49 present in the driver's cab 21, so that control or actuation of the quenching agent cannons may be performed from any seat 49 within the driver's cab 21.

Figure 6:
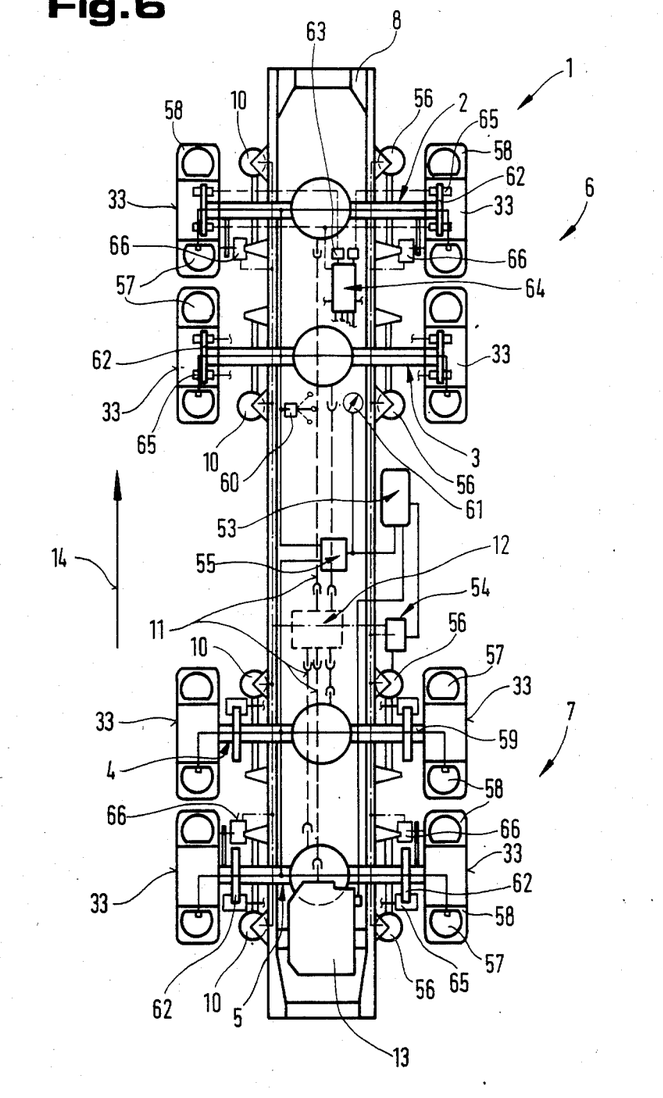
FIG. 6 is a diagrammatic plan view of a chassis frame of the service vehicle of FIGS. 1 to 5.

The drive layout and the pressure fluid supply diagram of the airport fire-fighting tanker vehicle 1 according to the invention are diagrammatically illustrated in FIG. 6, the driving axles 2-5 being driven individually by the driving engine 13 through the automatic transmission 12 and via respective drive shafts 11, each driving axle 2-5 carrying single wheels according to the commonly used type designation 8×8.

A pneumatic pressure fluid supply system 53 is associated with the driving engine 13, and supplies a load balancing device 54 and a tire pressure regulator system 55, and in addition to supporting the pneumatically performed functions in the airport fire-fighting tanker vehicle 1. Pressure fluid, in particular compressed air is supplied via the load balancing device 54, to the pressure fluid spring means 10, to move the chassis frame 8 or rather the superstructure elements arranged thereon to the required vertical position with respect to the base level of the wheels 33. The load balancing device 54 also serves when the vehicle is turning to draw pressure fluid from the pressure fluid spring means 10 situated at the longitudinal side of the vehicle facing towards the inner side of the turn, whilst pressure fluid is fed to the pressure fluid spring means 56 at the opposite longitudinal side of the chassis frame on the outside of the turn. The displacement of the superstructure with respect to the driving axles 2-5 caused by centrifugal force, for example whilst cornering at high speed, is counteracted in this manner. Due to the incorporation of the pressure fluid spring means 10,56 it is possible to adapt the superstructure height by vertical adjustment with respect to the driving axles 2 to 5 to the different operational conditions, for example during an operational drive along a metalled roadway or operational drive cross-country or when removing implements from the implement compartments 36,37.

The action of these pressure fluid springs 10,56 and in particular the compressed air suspension system acted upon by compressed air, is assisted by the tire pressure regulator system 55. To this end, an internal tire volume 57 of each tire 58 is connected to the tire pressure regulator system 55 via a respective pressure fluid pipe 59, the pipes 59 being situated within the driving axles 2 to 5 which are constructed as hollow axles. The tire pressure in the individual tires 58 may be matched to different driving conditions, for example slippery roads, cross-country or street driving, via control valves 60 operated from the driver's cab on the basis of pressure gauges 61. It is possible to maintain the stability of the airport fire-fighting tanker vehicle 1 by exercising a complementary balancing action against a tipping movement of the service vehicle during fast cornering by commensurate reduction of the tire pressure in the tires facing towards the inner side of the bend and by commensurate increase of the air pressure in the tires 58 facing the outer side of the bend.

The chassis frame 8 is suitably loaded by an approximately uniform longitudinal load distribution by arrangement of the structure of the chassis frame, the suspension system and the special layout of the separate assemblies or drives and quenching agent tanks, so that approximately identical drive conditions prevail at each of the driving axles 2 to 5. A balanced transmission of the driving power, a neutral cornering and steering behaviour and even wear of the tires 58 are secured thereby.

Respective disc brakes 62 are associated with the individual wheels 33 to provide an approximately constant braking behaviour even during protracted journeys and repeated braking operations, and to protect the braking action against effect of humidity or corrosive quenching foams. In this connection, it is advantageous for the brake pipes leading to the individual disc brakes to have individual control valves 63 which are controlled by an anti-locking system 64. The anti-locking system comprises speed transmitters 65 allocated to the wheels 33 which in case of a reduction of the speed of revolution of the wheel towards zero interrupt the supply of brake fluid through the control valve 63 or briefly vent the slave cylinder of the disc brake 62, so that a stoppage and thus skidding of the wheels 33 is prevented. It is also possible for the purpose of fully automatic control of the load compensator device 54 or even of the tire pressure regulator system 55, to install measurement senders 66 between the separate driving axles 2 to 5 or between these and the chassis frame 8, so that as a function of the suspension sag of the chassis frame a change of position of the chassis frame 8 with respect to the driving axles may be sensed and compensated by corresponding action of the pressure fluid springs 10 situated at the side in question.

Figure 7:
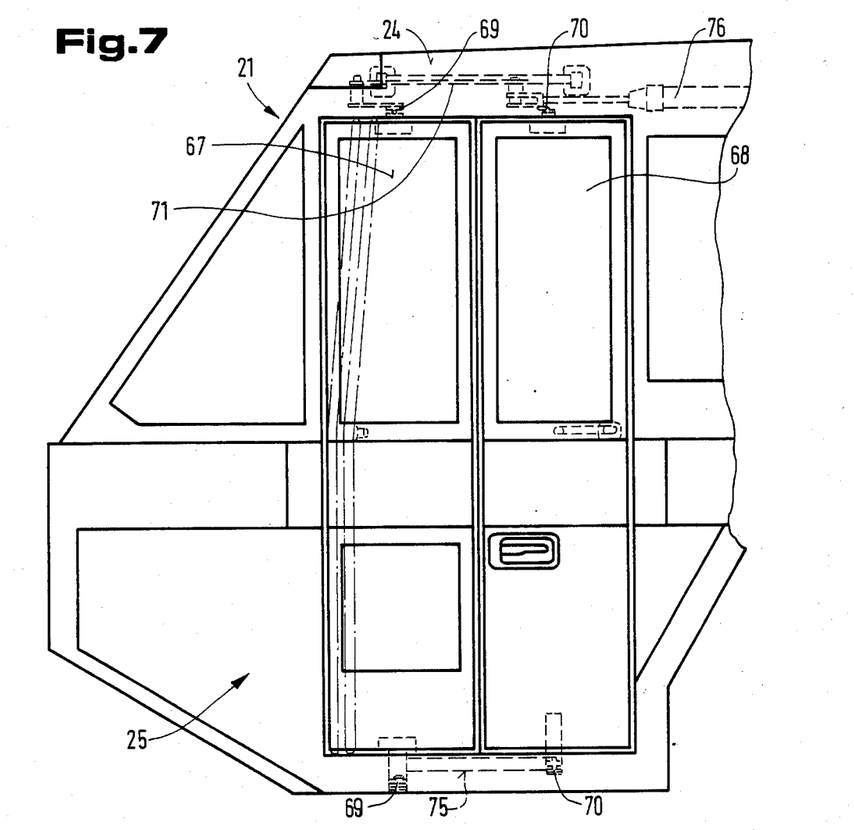
FIG. 7 shows a part of the driver's cab of the service vehicle of FIG. 1 to an enlarged scale and with an inwardly folding door installed therein.
Figure 8:
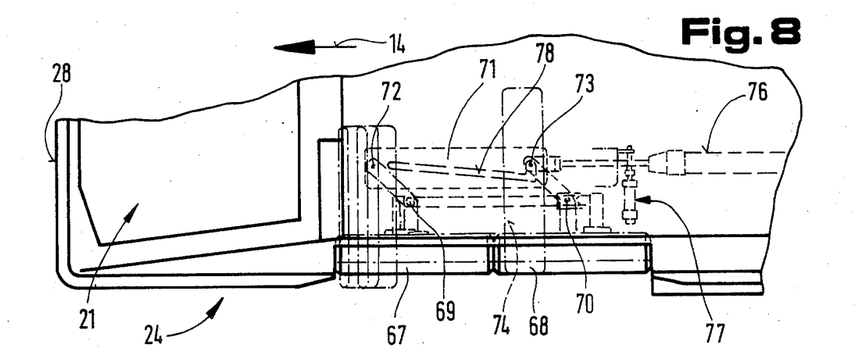
FIG. 8 is a fragmentary plan view of part of FIG. 7 showing the inwardly folding door.

The inwardly folding door 25 situated in a sidewall 24 of the driver's cab 21 is illustrated to an enlarged scale in FIGS. 7 and 8. The inwardly folding door 25 comprises two door sections, namely a front door section 67 and a rear door section 68. Each of the two door sections is pivotally installed around pivot spindles 69,70 offset inwardly of the driver's cab towards its central longitudinal axis. Respective pivot spindles 69 and 70 are allocated to each door section 67,68 in top and bottom portions thereof.

Each of the pivot spindles 69,70 associated with the top portions of the door sections has a rocking lever journalled on it. Outer portions of the rocking levers extend substantially at right angles to the door sections between the door section 67,68 and the pivot spindles 69 and 70 and inner portions of the rocking levers extend between the pivot spindles 69,70 and respective pivot pins 72,73 situated on a slide carrier 71 obliquely inwardly and forwardly of the driver's cab 21. The pivot spindles 70 associated with the door section 68 are displaceably mounted in longitudinal guides 74,75 for displacement forwardly in the direction of travel —arrow 14—of the vehicle. The slide carrier 71 is coupled via the pivot pin 73 to a longitudinal displacement drive 76. A transverse displacement drive 77 is operatively associated with the slide carrier 71 and is aligned transversely of the direction of travel 14. The pivot pin 73 is displaceably arranged within a generally L-shaped slide track 78 of the slide carrier 71.

Opening of the inwardly folding door 25 is effected such that the door sections 67,68 are pivoted inwards by a displacement of the slide carrier 71 by means of the longitudinal displacement drive 76 from the position shown in broken lines in FIG. 8 to that shown in chain dotted lines, the said door sections being pivoted from the closed position shown by solid lines to the half-open position shown by chain-dotted lines. The slide carrier 71 is thereupon displaced towards the centre of the vehicle by means of the transverse displacement drive 77, so that the pivot pin 73 is moved from the slide track section extending transversely to the direction of travel into the section of the slide track 78 extending longitudinally in the direction of travel. The door section 68 is thereupon placed in its final opened position alongside the door section 67 by means of the longitudinal displacement drive 76.

The closing of the inwardly folding door 25 occurs in reverse order. To lock the door sections 67,68 the door section 68 is equipped with a bolt lock which may be operated from the inside and the outside via a door handle, which engages via a thrust rod in a locking member situated in the driver's cab 21. The door section 67 is secured in both terminal positions via the pivot or rocking lever allocated to it, the pivot pin 72 and the longitudinal displacement drive 76.

This allows of unobstructed ingress and egress by the service operatives since the door sections 67,68 are congruently superposed at their inclined portions caused by the obliquity of the vehicle in the upper portion, so that the available door aperture may be utilised most efficiently. The accessibility of the seats 49 rearwardly offset with respect to the door is improved by the door sections being laid against the forward side of the door aperture.

Figure 9:
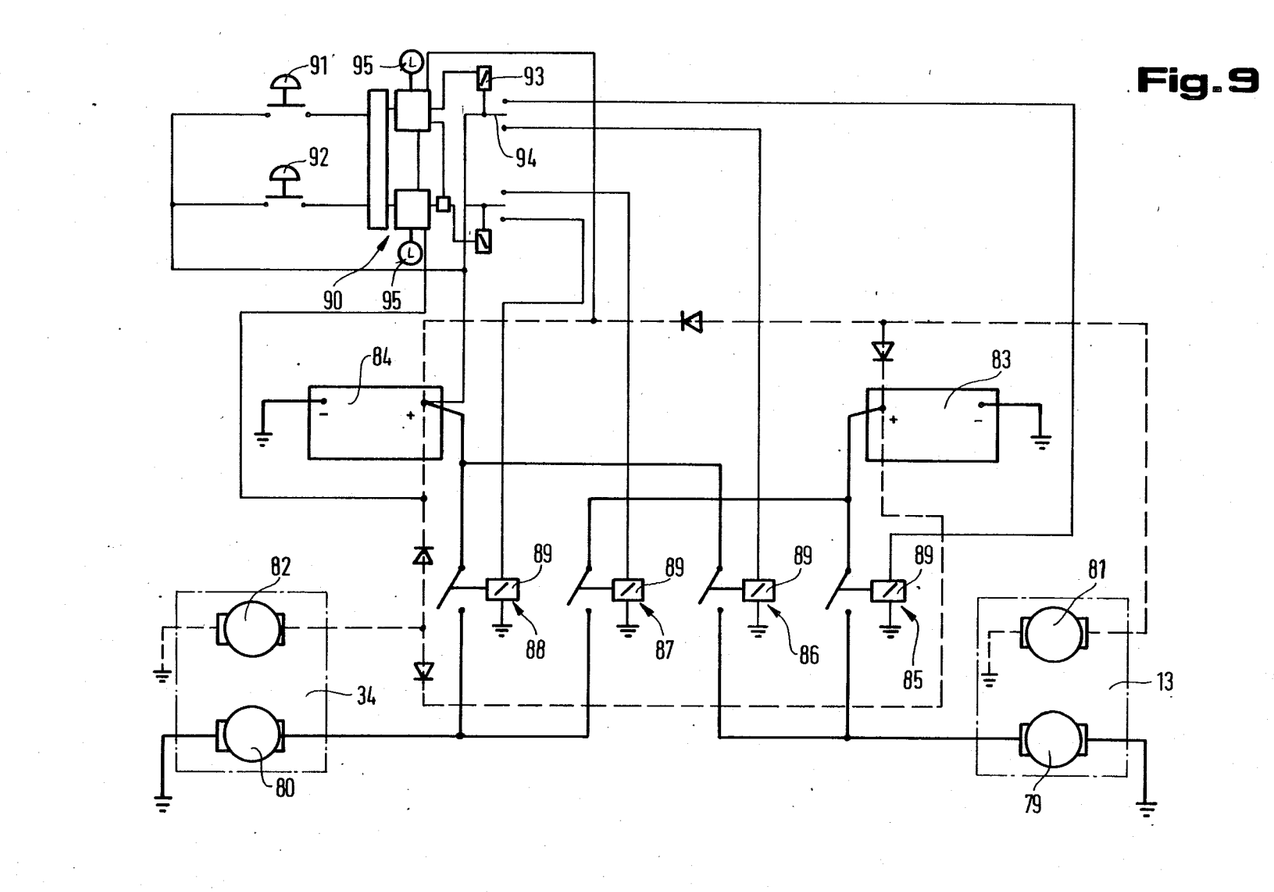
FIG. 9 is a simplified circuit diagram of a starting system for the service vehicle according to the invention.

A circuit layout of an automatic starting system for the airport fire-fighting tanker vehicle 1 will now be described in relation to FIG. 9. The driving engine 13 for wheel drive, as well as the motor 34 for the quenching agent pump 17, are provided with respective individual starters 79 and 80 and generators 81,82 and their own individual battery systems 83,84.

The starters 79,80 are connectable to respective battery systems 83,84 via remotely controllable switching means, comprising relays 85,86,87,88 having relay drives 89 connected to an electronic starting system 90 which is actuated for the driving engine 13 or for the motor 34 for the quenching agent pump, via switching elements 91,92 which may be operated manually or in fully automatic manner by remote control The operation of the electronic starting system 90 will now be described. If the switch element 91, for example a press switch, is actuated by the driver or via a remote control system after receipt of an operational signal, the supply wire leading to the relay 85 is connected to the battery system 83 via a relay contactor and the circuit is closed between the battery system 83 and the starter 79. A timing switch unit 95 is actuated at the same time, which switches the relay contactor 94 to the neutral central position after a preset interval of time has elapsed, and switches the relay contactor 94 to the wire leading to the relay 86 after another presettable unit of time has elapsed, thereby connecting the battery system 84 to the starter 79 of the driving engine for wheel drive. After the same interval has elapsed, the relay contactor 94 is reset to the neutral position and is thereupon again switched to the voltage supply conductor leading to the relay 86. These switching operations are repeatedly performed until the driving engine 13 starts and the generator 82 consequently supplies current. Once this has occurred, the starting operation for the driving engine 13 is stopped and the relay contactor 94 is displaced to its neutral position. A starting operation occurring in analogous manner may simultaneously be set in train for the motor 34 of the quenching agent pump 17. The initiation of the starting operation for the engine 34 is also dependent on whether the switching element 92 has already been actuated by remote control or manually. The starting operation for the engine 34 of the quenching agent pump 17 then occurs through utilisation of the relays 87,88 in the same manner as that described for the starting operation of the driving engine 13.

It has been found to be preferable for each battery system 83 and 84 to be connected to the associated starter 79 or 80 for a period of between 7 and 10 seconds, with a switch over period of approximately 2 seconds between the successive starting operations.

Figure 10:
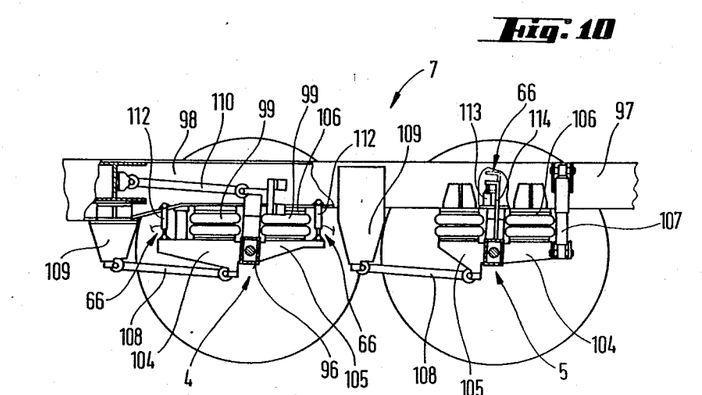
FIG. 10 is a side elevation of the rear undercarriage of the vehicle section to show the axle suspension.
Figure 11:
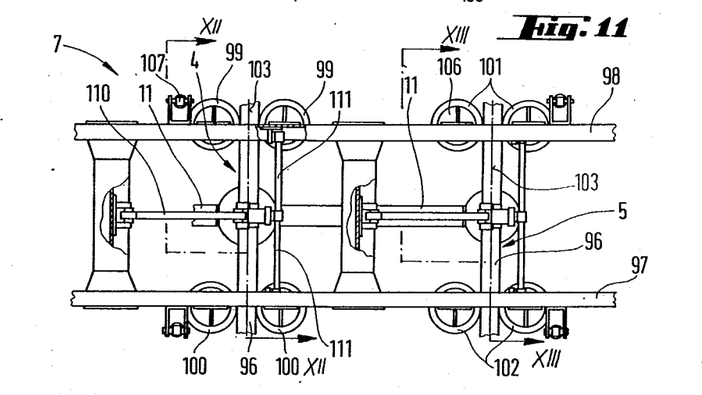
FIG. 11 is a plan view of the rear undercarriage of FIG. 10.

The suspension of the driving axles 4,5 of the rear undercarriage 7 of the airport fire-fighting tanker vehicle is illustrated in detail in FIGS. 10 and 11. An axle casing 96 of each of the driving axles 4,5 is supported via two pairs of pressure fluid spring means 99,100 and 101,102 respectively, in the region of longitudinal bearers 97,98 at opposite sides of the vehicle. The pressure fluid spring means of each pair 99 to 102 allocated to the axle casing 96 of the driving axles 4 and 5 are arranged in each case in the longitudinal direction of the longitudinal bearers 97,98 at either side of an axle centre line 103 and bear at lower ends on brackets 104,105 which are secured on the axle casing 96, and at upper ends bear on thrust plates 106 fastened on the longitudinal bearers 97 and 98, via gusset or fish plates. To this end, the pressure fluid springs 99 to 102 are arranged below the longitudinal bearers 97,98 in a manner such that lateral outwardly facing sides of the longitudinal bearers 97,98 extend approximately centrally with respect to the upright central axes of the pressure fluid springs 99 to 102, which central axes extend parallel to the sides. Shock absorbers 107 are mounted between cantilevers projecting from the longitudinal bearers 97,98 and the brackets 104, and the brackets 104 in the case of the driving axle 4, and the brackets 105 in the case of the rear driving axle 5, are pivotally coupled to torque bearers 109 via longitudinal lower links 108. An upper longitudinal link 110 is also provided centrally between the bearers 97,98 and which is pivotally connected to the torque bearer 109 and the axle casing 96 above the thrust plates 106. The coupling points of the longitudinal links 108,110 of approximately the same length of the torque bearer 109 are staggered a little in the direction of travel —arrow 14—so that the axle centre line 103 is substantially displaced on a straight line extending at right angles to the wheel tread plane and approximately centrally between the pressure fluid springs 99 to 102 even in the case of different relative displacements between the driving axles 2 to 5 and the chassis frame 8. For lateral stabilisation of the axle casings 96, transverse links 111 are installed between the two longitudinal bearers 97 and 98 and the fastening points of the upper longitudinal links 110 on the axle casings 96.

Figure 12:
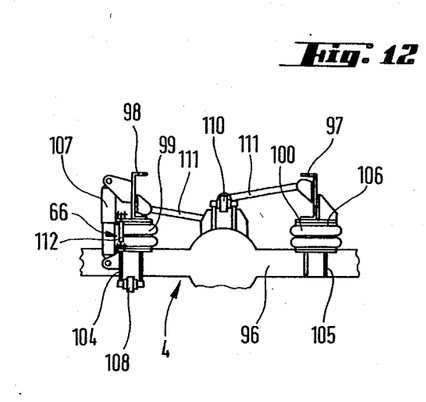
FIG. 12 is a fragmentary end view of the forward driving axle of the rear undercarriage assembly of FIGS. 10 and 11 in cross-section on line XII—XII in FIG. 11.
Figure 13:
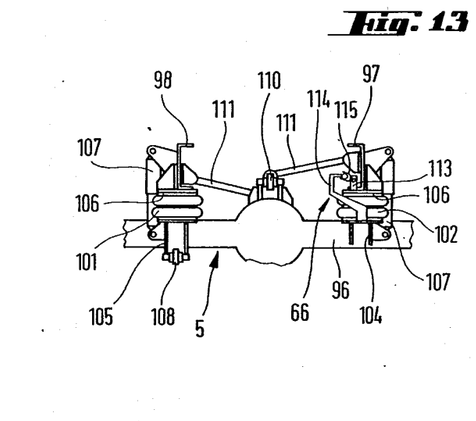
FIG. 13 is a fragmentary end view of the rear driving axle of the rear undercarriage assembly of FIGS. 10 and 11 taken on line XIII—XIII in FIG. 11.

As seen in the longitudinal direction of the longitudinal bearers 97,98, the arrangement of the axle casings 96 and the connections of the axle casings 96 via the pairs of pressure fluid springs 99,100 and 101,102, respectively is shown more clearly in FIGS. 12 and 13, from which it is apparent that the coupling points of each of the transverse links 110 on the longitudinal bearers 97,98 and on the axle casings are vertically offset by the same amount. In connection with the three-point mounting of the axle casing via the lower and upper longitudinal links 108 and 110 and the high degree of flexibility of the pressure fluid springs 99,100, a high degree of mobility of the driving axles 4 and 5 is obtained in the vertical as well as lateral directions and it is thus possible to obtain an unexpectedly satisfactory cross-country driving facility of the airport fire-fighting tanker vehicle when driving in the rough off metalled roads, and extremely satisfactory driving ease under simultaneous utilisation of pressure fluid springs during cornering and at high speeds, as required on the metalled roadways for vehicles of this nature.

Two different forms of embodiment of reading senders 66 for establishing the spring suspension of the chassis frame 8 or rather of the longitudinal bearers 97,98 with respect to the driving axles 2 to 5 for action on the load compensator or leveller device 54—FIG. 6—are also illustrated in FIGS. 10,12 and 13. A pair of reading senders 66 for the driving axle 4 is arranged in the area of the two pressure fluid springs 99 placed one behind another between the forward and rearward brackets 104,105 and the longitudinal bearer 97, and comprise measuring sensors 112 which may for example be formed by moving coil measuring instruments, potentiometers or other electromechanical reading senders. It is now possible with these two measuring sensors 112 to establish the position of the brackets 104,105 with respect to the longitudinal bearer 97 and the position of the axle centre line may be determined by establishing the mean value between the measured values.

In contrast, the measurement sender 66 allocated to the driving axle 5 is formed by a switch 113, e.g. a three-position switch which comprises a zero setting and upper and lower switching positions. At the zero setting, at which an actuating lever 114 connected to the axle casing 96 is situated in the position shown by solid lines, the driving axle 5 is situated in its scheduled position with respect to the longitudinal bearer 97. If, for example whilst cornering at high speed, the superstructure with the longitudinal bearers 97,98 is shifted with respect to the driving axles 2 to 5, the distance between the brackets 104,105 and the longitudinal bearers 97 undergoes a reduction in the case of the longitudinal bearer situated at the outside of the bend. This displaces the thrust plate 106 downwards in the direction of the brackets 104 or 105 respectively and a switching lever 115 of the switch 113 is displaced in the direction of the top flange of the longitudinal bearer 97. At the same time, a load relief or a reduction of the force bearing on the driving axle 5 occurs in the area of the longitudinal bearer situated at the inside of the bend, so that the switch lever 115 is displaced in the direction of the bottom flange or chord of the longitudinal bearer 98. If this switch is then coupled direct to an actuating valve for supply of compressed air to the pressure fluid springs 99 to 102, pressure fluid may be fed to the pressure fluid springs 101 as a function of the position of the switch lever 115 to counteract spring sag in the case of a reduced spacing between the longitudinal bearer 97 and the brackets 104,105, whereas at the lightened side the increase of the spacing between the longitudinal bearers 98 and brackets 104,105 in the area of the longitudinal bearers 98 may be counteracted by reducing the air pressure in the pressure fluid springs 102. Because either each pressure fluid spring 99 to 102 has allocated to it a measurement sender 66 in each case, or this measurement sender senses the displacements of the driving axle 5 with respect to the longitudinal bearers between the two pressure fluid springs, it is assured that displacements or changes of the spring trajectory upon starting off or during braking actions between the two pairs of pressure fluid springs 99,101 or 100,102 allocated in each case to a longitudinal bearer and to a driving axle, do not affect the variation of the air pressure or spring force in the area of the pressure fluid springs 100,102 or 99,101 allocated to the oppositely situated longitudinal bearer.

Figure 14:
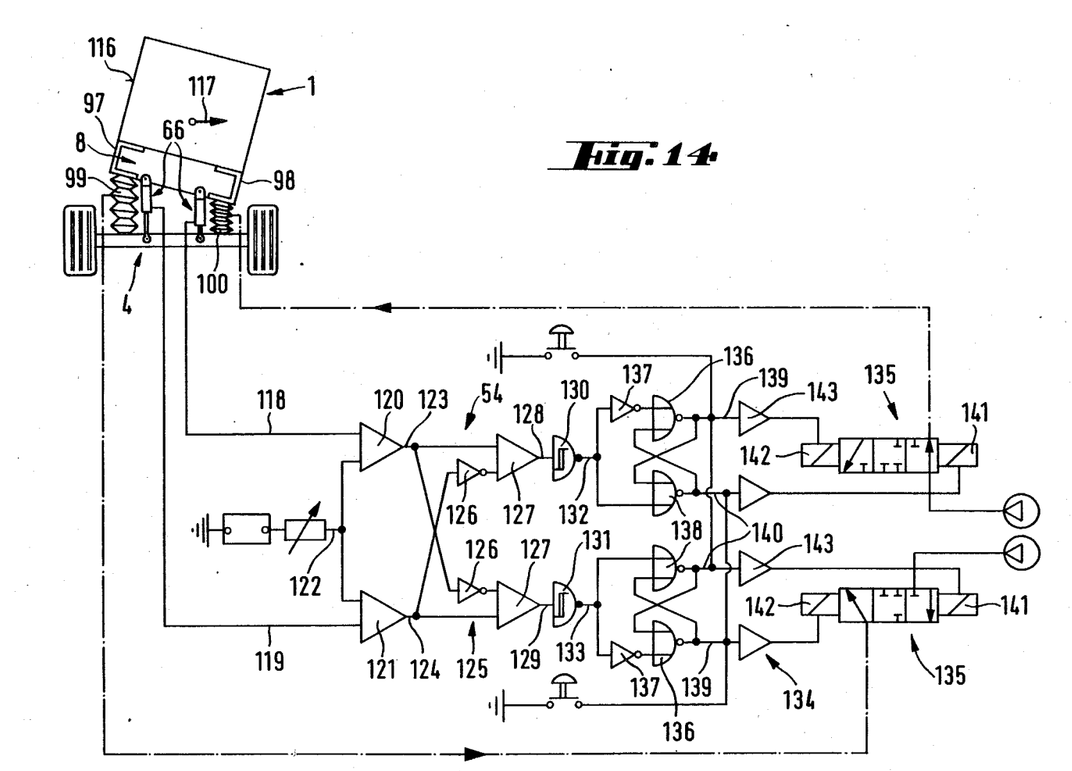
FIG. 14 is a connection layout of the vehicle load equaliser device for the pressure fluid spring means situated between the driving axles and the chassis frame in a simplified diagrammatic illustration.

The airport fire-fighting tanker vehicle 1 is shown diagrammatically in FIG. 14, showing the position of a superstructure 116 with respect to a driving axle 4 whilst cornering at high speed. Whilst cornering, the action of centrifugal force 117 tends to tip over the superstructure 116 in the direction of the outside of the bend. The inclined state of the superstructure 116 with respect to the driving axle 4 being illustrated in exaggerated manner to facilitate comprehension. Furthermore, the chassis frame 8 comprising the longitudinal bearers 97 and 98, and the associated pressure fluid springs 99 and 100, which are situated between the chassis frame 8 and the driving axle 4, are apparent in this illustration. The displacement of the superstructure 116 induced by the centrifugal force 117 is the cause, as shown diagrammatically, for a higher load on the pressure fluid springs 100 and for a lower load on the pressure fluid springs 99. This deflection or positional change of the chassis frame 8 with respect to the driving axle 4 may now be detected by means of the measurement sender 66. The readings are fed to a loadcompensator device 54. The readings of the measurement senders 66 supplied via the conductors 118 and 119 are compared in differential amplifiers 120 and 121 to a reference signal which corresponds to the scheduled position between the chassis frame 8 and the driving axle 4, i.e. to their mutually parallel position, and is fed to the two differential amplifiers 120,121 via a conductor 122. The prevailing signal difference, or differential reading is determined in this way. The two signals fed to conductors 123, 124 at the output terminals of the differential amplifiers 120,121 are compared in a comparator stage 125. To this end, the signals from the conductors 123,124 are complementarily fed to differential amplifiers 127 via inverters 126. In these, the reciprocals of the signals coming from the conductor 123 are compared to the measurement values in the conductor 124, or the reciprocals of the signals in the conductor 124 are compared to the measurement values in the conductor 123. If the two differential measurement values determined by means of the differential amplifiers 120 and 121 have the same sign and the same value, no signal will appear in the conductors 128 and 129 connected to the output terminals of the differential amplifiers 127. The load equaliser device is thereby prevented from coming into operation in case of an uniform suspension deflection of the superstructure 116 with respect to the driving axle 4. If however, as in the example of embodiment illustrated, output signals by the amplifiers 127 are caused by the difference in sign between the readings obtained, these signals are fed via the conductors 128 and 129 to threshold value switches 130 and 131. These threshold value switches have a lower and upper switching threshold, a different signal being transmitted to the following conductor 132,133, depending on whether the upper or lower switching threshold is exceeded. It is then determined in a subsequent evaluator unit 134 whether the output signal from the threshold value switches 130,131 contained in the conductor 132 or 133 should be shifted for a displacement of a control valve 135 into a position corresponding to a pressure drop or pressure rise in the pressure fluid springs 99 or 100. To this end, the conductor 133 is connected direct to an input terminal of a NOR element 135 on the one hand, and on the other hand to an input terminal of a NOR element 138 via an inverter 137. The conductors 139 and 140 connected to the output side of the NOR element are in each case led to the second input terminal of the NOR element 138 or 136 preceding the other conductor 140 or 139. An electromagnet 141 or 142 is then energised depending on the position of the signal, for displacing the control valve 135 to the one switching position or the other. In the extension of the conductors 139 and 140, power output stages 143 are foreconnected to the electromagnets 141,142. If for example, as determined by means of the measurement transmitter 66 in the present example, the pressure fluid spring 99 is relieved of load at the inner side of the bend, and the pressure fluid spring 100 is compressed at the outside of the bend, a signal having a negative sign with respect to the inoperative position is delivered via the conductor 118, and a signal having a positive sign is delivered via the conductor 119, to the differential amplifiers 120 and 121. Upon comparing the reference signal derived from the conductor 122, output signals having positive and negative signals are equally obtained in the conductors 123,124 following the differential amplifiers 120 and 121. By comparing the signals of the two conductors to the reciprocals derived from the opposed conductors in each case, it is determined that the displacement of the superstructure 116 with respect to the driving axle 4 is not even but uneven. These signals in the conductors 128 and 129 then have the result that one of the threshold value switches 130, being that allocated to the pressure fluid spring 100, detects a drop below the nominal signal and feeds a corresponding signal to the evaluator unit 134, which leads to an increase in pressure in the pressure fluid spring 100. On the contrary, the threshold value switch 131 feeds a signal corresponding to a pressure drop in the pressure fluid spring 99 to the evaluator unit 134. The control valve 135 allocated to the pressure fluid spring 99 is accordingly displaced by action on the electromagnet 142 into the position causing the venting of the pressure fluid spring 99. At the same time, the control valve 135 allocated to the threshold value switch 130 and to the pressure fluid spring 100 is displaced into a switching position causing a pressure rise in the pressure fluid spring 100 by energisation of the electromagnet 141.

This displacement occurs until the superstructure 116 has been returned or returns to its scheduled position with respect to the driving axle 4.

For the sake of a clearer understanding, it should be noted that an extreme deflection of the superstructure 116 with respect to the driving axle 4, such as diagrammatically shown in the drawing, can hardly occur thanks to the rapid action of the switching device and to the immediately intervening pressure rise or pressure drop in the pressure fluid springs. On the contrary, a deflection is acted against immediately it occurs, by appropriately increasing and lowering the pressure in the pressure fluid springs 99,100. If the centrifugal force 117 diminishes, the pressure ratio in the pressure fluid springs is modified again reciprocally and equally as a function of the return of the superstructure to its scheduled position, i.e. a pressure rise occurs in the pressure fluid spring 99 and a pressure drop occurs in the pressure fluid spring 100.

Furthermore, it is advantageous and within the scope of the invention in the case of a control system of this nature, that the pressure fluid springs mutually opposed on the same axle, that is to say 99 and 100, should not be interlinked by circuitry. The mutually opposed pressure fluid springs of consecutive driving axles, for example being the pressure fluid springs 99 of the driving axle 4 and the pressure fluid springs 102 of the driving axle 5 may be linked by circuitry, whereas the pressure fluid springs 100 of the driving axle 4 are linked by circuitry to the pressure fluid springs 101 of the driving axle 5. This prevents the control system already being activated upon encountering a pothole, that is by unevenness of the roadway during a drop at one side of a wheel 33 of a driving axle 2 to 5, and actually authorises said activation only when an appropriate displacement of the superstructure occurs with respect to the driving axles, with respect to a larger plane—namely the ground plane of the four wheels of the two consecutively positioned driving axles 4 or 5.

Thanks to this load equaliser device 54, it is unexpectedly accomplished that the speed on bends may be increased with increased driving safety in the case of such airport fire-fighting or service vehicles and that the periods of approach to different incident locations within the area of an airport terrain may be shortened considerably.

Figure 15:
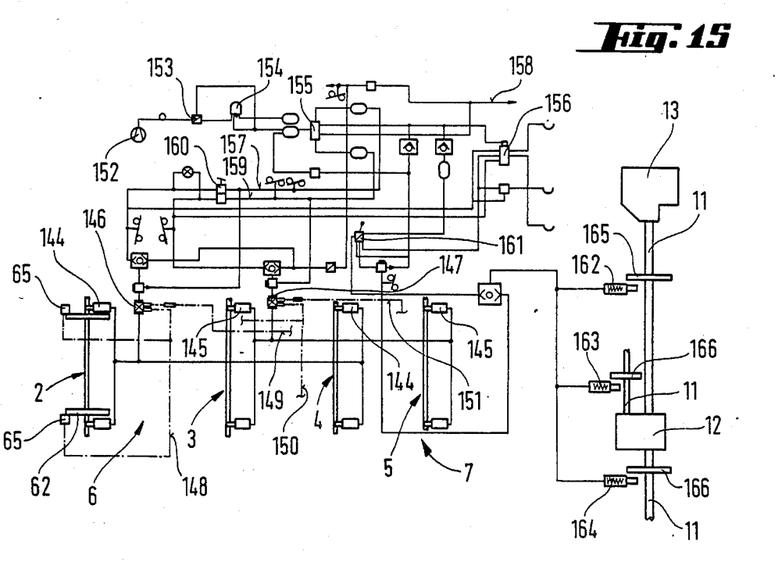
FIG. 15 is a connection layout of the vehicle braking system in a simplified form of diagrammatic illustration.

Another important feature of the inventive airport fire-fighting tanker vehicle 1 is depicted in FIG. 15 in the form of a wiring diagram. Substantially higher demands are also made on the braking system in view of the higher cornering speeds and driving speeds rendered possible by the load equaliser device 54. To this end, provision is now made for the brake cylinders 144 and 145 which are allocated to the disc brakes 62—FIG. 6—to have associated with them in each case an anti-locking valve 146,147 of an anti-locking system 64—FIG. 6. One anti-locking valve 146,147 is allocated to four brake cylinders 144 and 145 respectively, the braking cylinders 144 being associated with the front driving axles 2 and 4 and the rear driving axles 3 and 5 comprised in the front and rear undercarriages 6 and 7 respectively. Rotation senders 65 situated in the area of each of the disc brakes 62 are allocated to the anti-lock valves 146,147, as shown diagrammatically in the drawing in respect of the front driving axle 2. The rotation senders 65 of the driving axle 2 are connected to the anti-lock valve 146 via a conductor 148, and the rotation senders of the driving axle 4 via a conductor 149. In the same way, the rotation senders 65 of the driving axles 3 and 5 are connected to the anti-lock valve 147, via conductors 150,151. The compressed air for the braking system passes from a compressor 152 and via a pressure regulator 153 and an air drying system 154 to compressed air tanks, a four-circuit protective valve 155 and from thence to a trailer control valve 7, to supply lines 156,157 for the two braking circuits and a supply line 158 for a tire pressure control system 55. The two supply lines 156,157 extend via the foot brake valve 159 which has appropriate indicator units allocated to it, pressure switches and intermediate valves to the anti-lock valves 146 and 147. The action of the anti-lock valves is then such that upon depressing the foot brake pedal 159, the braking action or pressure actuation of the brake cylinders 144 is then interrupted briefly when one of the wheels of the driving axles 2 or 4 stops completely or substantially completely, i.e. being locked, whereby it is accomplished that the maximum braking retardation is obtained whilst the wheels are still turning, and that the vehicle still remains wholly controllable. In the present case, one axle of each of the two undercarriages was combined in balanced manner in each case with a respective anti-lock valve 146 and 147, since as determined by experience, the driving axles associated with the front undercarriage are more liable to lock, and an adequate braking action is obtained if the two driving axles associated with the front undercarriage are acted upon with the maximum value of the braking force independently of each other.

Furthermore, the line leading from the four-circuit protective valve 155 to the trailer control valve 156 supplies a handbrake valve 161. The line from the handbrake valve 161 leads to brake cylinders 162,163 and 164. The brake cylinder 162 has associated with it a brake disc 165 situated on a driving shaft 11 between the driving engine and the automatic transmission 12, and a brake disc 166 situated on the corresponding driving shafts 11 leading to the front and rear undercarriages 6,7 is associated with the brake cylinders 163 and 164. Thanks to this distributed arrangement of brake discs on the separate driving shafts between the different drive elements, it is made possible to obtain the maximum retardation prescribed by law for the hand brake in such vehicles without the complementary incorporation of drum brakes or the like.

Figure 16:
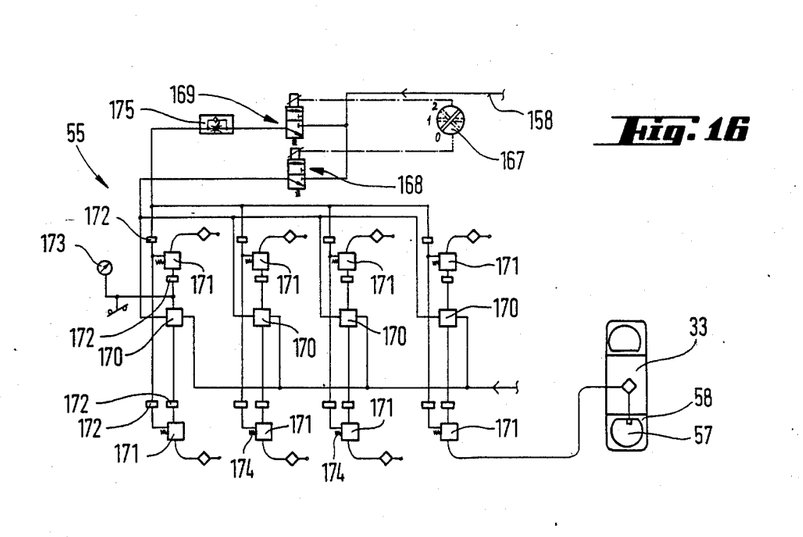
FIG. 16 is a connection layout of the tire pressure control system of the vehicle in a simplified form of diagrammatic illustration.

The connection layout of the tire pressure control system 55 is illustrated in FIG. 16. The tire pressure control system 55 is fed with compressed air via the line 158 from the compressor 152. The activation of the tire pressure control system may be performed via a selector switch 167 having three switching positions 0, 1 and 2. The control valves 68,69 are not energised in switching position 0 of the selector switch 167, shown by solid lines, and the lines joining these control valves to the relay valves 170 and the tire pressure control valves 171 are vented. The lines between the tire pressure control valves 171 and the control valves 68,69 are thus unpressurised as are the rotors 172 interposed between the said valves in these lines. The rotors 172 establish the line connection with the tire pressure control valves 171 situated in the wheels 33 rotating with respect to the driving axles 2 to 5.

These tire pressure control valves 171 have a mechanically operated locking element which interrupts further venting of the internal volume 57 of the tire via the tire pressure control valve 171 at a presettable pressure in the internal volume 57 of the tire—FIG. 6. This ensures that a minimum pressure, for example of 3 bar—which may differ however according to tire and vehicle types—is maintained.

If the tire pressure is to be increased, the selector switch 167 is shifted to position 1—shown dotted—and the control valve 168 is activated, thereby feeding compressed air from the pipe 158 to the internal volumes 57 of the tires 58. The pressure rise within the internal volumes of the tires may be monitored by means of pressure gauge 173, which pressure gauge may if appropriate also be coupled to a safety valve so that it is assured in any event that the maximum permissible pressure for the internal volumes 57 of the tires is not exceeded. The compressed air coming from the compressor via the branch pipe 158 is fed to the internal volume of the tires via the relay valves 170 and the tire pressure control valves 171. The variation in tire pressure may be performed in infinitely variable manner between the minimum inflation pressure mechanically set on the tire pressure control valve 171 and the maximum inflation pressure. Once the required pressure lying between the two limiting values has been reached in the internal volume of the tire and the inflating operation is to be stopped, the selector switch 167 is shifted to the position 2—shown dash-dotted—thereby activating the control valve 169 and terminating the action on the control valve 168. Thanks to the action on the control valve 169, compressed air is supplied from the pipe 158 to the tire pressure control valves 171 via rotors 172, and the pipe connection between the relay valve 170 and the internal volume 57 of the tires 58 is interrupted and shut off. The pressure within the internal volume 57 of the tires is kept constant thereby. The selector switch 167 is then moved back to the 0 position, thereby also terminating the action on the control valve 169 and both control valves 168 and 169 are then in communication with the ambient air, so that the compressed air present in the pipes between the tire pressure control valves 171 and the control valves 168 and 169 may escape. These pipes are thus depressurised, as are the rotors 172, and the compressed air is confined between the tire pressure control valve 171 and the internal volume 57 of the tires.

If the tire pressure is to be reduced in the internal volume 57 of the tires, the selector switch 167 is briefly moved to the switching position 1, so that a pressure pulse passes from the pipe 158, via the relay valves 170 and to the tire pressure control valves 171 and freeing the passage through the pipe to the internal volume 57 of the tire. The immediately following interruption of the action on the control valve 168 connects the pipe connected to the control valve 158 to the ambient air and the air can escape from the internal volumes of the tires. If this action is to be interrupted, the selector switch 167 need merely be moved briefly to the switching position 1, then to the switching position 2 and then again to the switching position 0, thereby interrupting the connection through the piping system between the internal volume of the tire and the relay valve 170 in the tire pressure control valve. If, on the contrary, a measure of this nature is not performed, the pressure in the internal volume 57 of the tire is reduced until the minimum inflation pressure is reached, whereupon the connection through the piping system between the internal volume 57 of the tire and the relay valve 170 is interrupted by means of a spring-loaded mechanical shut-off element 174.

A restrictor check valve 175 arranged in the pipe between the control valve 169 and the tire pressure control valves 171 is intended to prevent the control pressure in the tire pressure control valves 171 being reduced after the closing action any earlier than in the pipes leading from these to the control valve 168, to prevent the closing element in the tire pressure control valves 171 from being reopened by an increased pressure in the pipes last referred to, to avoid the possibility that an accidental deflation of the internal tire volumes 57 could occur.

Thanks to the combination between the tire pressure control system 55 and the load equaliser device 54 and the anti-locking system 64, a more versatile application of the airport fire-fighting tanker vehicles is rendered possible in an unexpectedly uncomplicated manner, since the change from operation on metalled roadways to cross-country operation may be performed more rapidly and an even more satisfactory adaptation to driving conditions on metalled and rough roads may be secured.

The advantages of this unexpectedly uncomplicated solution consist in that the layout of the chassis frame of the inventive service vehicle in conjunction with the pressure fluid springs and the arrangement of the driving engine and automatic transmissions establish the conditions for loading the chassis frame with an almost uniform load distribution throughout its length. This provides for a substantially improved driving behaviour of the service vehicle. By use of pressure fluid springs that the essentially satisfactory load distribution conditions and the satisfactory driving qualities obtained thereby may be readily adapted to the rapidly varying driving conditions which may be experienced, e.g. a metalled road or rough terrain. The driving qualities and the cornering speeds may be improved further during travel on metalled roads or runways by a displacement of the chassis frame into a lowered position with respect to the driving axles. The service vehicle may then be driven immediately from the metalled roadway and on to the rough without delaying its utilisation to fight a fire, since the chassis frame and the superstructures present may then readily be raised with respect to the driving axles and placed in the cross-country driving position by the driver when approaching the point of emergency and upon identifying the conditions. The first-aid measures essential to save lives with service vehicles on airports may thereby be taken earlier than has so far been usual whilst a greater stock of extinguishing agent may be carried to the point of application.

The use of disc brakes with the wheels of the driving axles allows the braking performance to be kept substantially constant even in the case of repeated extremely powerful decelerations of the high-weight service vehicle from high speeds, for example such as frequently is the case before reaching bends along an operational path. In addition, a reduction of braking performance, for example by penetration of moisture or as a result of excessive temperatures, as may occur at points of application at airports, is largely prevented.

The provision of three quenching agent launchers or cannons in the area of the front undercarriage, one being mounted on the roof of the driver's cab and two on its forward side make it possible to fight fire outbreaks in front of the service vehicle from an area below the windscreen, so that an unobstructed view is available of areas situated above the outbreak, in which connection endangered points situated at a higher level or at a greater distance, may be observed, and other outbreaks may be fought separately, by means of the quenching agent cannon situated on the roof. This is particularly advantageous if, for example, an undercarriage fire in an aircraft is being fought with forward lower quenching agent cannons and the roof-mounted quenching agent cannon is utilised for safeguarding purposes or for laying a protective foam carpet in the areas of human occupation or fuel tanks.

The accommodation of the lower cannons within the delimitation of the bodywork when not in operation allows a clear field of view for the driver during normal driving. Cannons are stowed under protection against soiling during the approach to the point of application, and also against freezing-up and the like.

The provision of a two-section folding door of which the sections are pivotable inwardly, and the rear door section being displaceable towards the forward side of the driver's cab renders it possible to drive the vehicle without altering the overall width even with the doors opened, or to drive off already before the door is completely closed. The small space required within the cab by the door is advantageous so that alighting by the personnel and mobility within the cab are not significantly impeded.

The provision of floor spray nozzles in the area of the undercarriages, so that the quenching agent may be utilised not only to fight a fire but also to protect the vehicle is advantageous.

The provision of controlled repeated operation of the starter or starters of the driving engine undercarriages and/or of the quenching pump motor is advantageous in providing for a rapid and trouble-free starting action with minimum preoccupation of the crew of the vehicle.

Thanks to the embodiments disclosed and described in connection with FIGS. 10 to 16, smooth running of pneumatic suspension; all wheel drive cross-country vehicles is obtained, and the advantages of pneumatic suspension are exploited in unexpected manner to raise possible cornering speeds. Furthermore the driving safety and tractive action of the vehicle are considerably improved both as regards metalled road and cross-country performance.

Whilst the invention and many of its attendant advantages will be understood from the foregoing description it will be understood that changes may be made in the form, construction and arrangement of the parts without departing from the spirit and scope of the invention.

What is claimed is:

1. A service vehicle for use as a fire-fighting tanker vehicle comprising an uninterrupted chassis frame carrying a driver's cab and supported by four driving axles driven independently of each other by a driving engine, the four driving axles being carried on the chassis frame via pressure fluid springs at opposite sides of the vehicle and the pressure fluid springs associated with wheels at one side being connected via a pressure fluid supply system and a load compensator system to the pressure fluid springs associated with wheels situated at the other side of the vehicle, an automatic transmission situated between front and rear undercarriages each comprising two of said driving axles, the driving axles of each undercarriage being separately coupled to the automatic transmission which is coupled to the driving engine situated on the chassis from above the rear undercarriage, and quenching agent tanks and a quenching agent pump arranged on the chassis.

2. A service vehicle according to claim 1, characterised in that an internal tire volume of each of the wheels of the driving axles is connected to the pressure fluid supply system via a tire pressure regulator system and that each internal tire volume is associated with a respective regulator valve in the tire pressure regulator system.

3. A service vehicle according to claim 2, in which the tire pressure regulator system has relay valves and the valves may be acted upon via separately operated controls, the tire pressure regulator valves are placed on the revolving wheels and are equipped with a shutoff element which interrupts the passage through a piping system between the internal tire volume and the relay valve via the regulator valve and which has limit means adapted automatically to interrupt if the pressure drops below a minimum inflation pressure.

4. A service vehicle according to claim 1, characterised in that respective disc brakes are associated with each of the wheels of the driving axles.

5. A service vehicle according to claim 4, in which the disc brakes associated with a driving axle of the front undercarriage and of a driving axle in the rear undercarriage are coupled with an anti-locking valve of an anti-locking system and each disc brake of the two undercarriages has allocated to it a rotation transmitter whereof the output terminals are coupled to the input terminals of the said anti-locking valve which is also connected to the brake cylinders appertaining to the corresponding disc brakes.

6. A service vehicle according to claim 5 in which a four-circuit protective valve of the disc brakes is connected via a handbrake valve to three brake cylinders which cooperate with brake discs of which one is situated on a driving shaft between the driving engine and automatic transmission and the other two are situated on driving shafts between the automatic transmission and the front and rear undercarriages respectively.

7. A service vehicle according to claim 1, in which the quenching agent tank for a liquid quenching agent is situated between the two undercarriages, the quenching agent pump is coupled to a pump drive motor and is positioned closer to the front undercarriage adjacent to the driver's cab, a quenching agent tank for pulverulent quenching agent, are a propellant gas system and foaming agent tanks are being situated above the front undercarriage between the quenching agent pump and the driver's cab which is situated in front of the front undercarriage.

8. A service vehicle according to claim 1, in which three quenching agent cannons are installed forwardly of the front undercarriage, one being situated on the roof of the cab and two in a forward side thereof facing away from the forward undercarriage.

9. A service vehicle according to claim 8, in which the said two quenching agent cannons are situated side-by-side below a forward windscreen of the driver's cab are arranged to have an inoperative position within a housing within the cab bodywork, and an operational position projecting forwardly therefrom, the housing for the quenching agent cannons being closable by means of a displaceable flap.

10. A service vehicle according to claim 9, in which one of the said two quenching agent cannons is connected to a quenching agent tank for pulverulent quenching agent and the other to a quenching agent pump for quenching foam.

11. A service vehicle according to claim 1, in which a two-piece section inwardly folding door is installed forwardly of the front undercarriage in a sidewall of the driver's cab, front and rear sections of the door being pivotable internally of the cab about respective pivot spindles disposed substantially centrally of the widths of the door section, and the rear door section is arranged to be displaceable on a guiding device directed forwardly of the driver's cab.

12. A service vehicle according to claim 1, in which floor spray nozzles are installed in the region of the undercarriages and are connected to the quenching agent pump via control valves.

13. A service vehicle according to claim 1, in which respective starters of the driving engine associated with the undercarriages and/or of a motor associated with the quenching agent pump is or are adapted to be periodically and successively connected via an electronic starting system to a respective battery system until engine starting occurs.

14. A service vehicle as claimed in claim 13, in which respective connectors associated with the driving engine and the pump motor are arranged on operation of the engine to set respective relay means controlling the starting operation to a neutral position.

15. A service vehicle according to claim 1 in which the chassis frame includes two longitudinal bearers, each of the driving axles is supported in the area of each of the longitudinal bearers of the chassis frame via pairs of said pressure fluid spring means which are arranged one behind another in the direction of travel, and an axle casing is supported via two longitudinal links arranged in the area of the two longitudinal bearers and one longitudinal link positioned between them and via two transverse links arranged parallel to the driving axle each of which extends between a central region of the driving axle and a respective one of the longitudinal bearers.

16. A service vehicle according to claim 15, in which each axle casing is supported at each bearer by upper and lower longitudinal links which are of approximately equal length and the coupling points are arranged with mutual spacing in the direction of vehicle travel on a torque bearer, each axle centre line, in an idle position, being situated approximately centrally between the two pressure fluid spring means of each pair.

17. A service vehicle according to claim 15, in which a shock absorber is allocated to each driving axle parallel to the pressure fluid spring means, the shock absorbers of an undercarriage being situated at the two sides of the axles facing away from each other.

18. A service vehicle according to claim 15, in which respective measurement senders are pivotally coupled between the longitudinal bearers and each axle casing at locations approximately centrally between the two pressure fluid springs or to each of the two pressure fluid spring means.

19. A service vehicle according to claim 18, in which the measurement senders associated with the pressure fluid springs and one longitudinal bearer are coupled via a load equaliser device with the measurement senders, which are associated with the pressure fluid springs at the oppositely situated longitudinal bearer, the measurement senders situated between one driving axle of an undercarriage and the one longitudinal bearer being coupled to the measurement senders situated between the other driving axle of the undercarriage and the other longitudinal bearer via lines to the comparator stage of the load equaliser device.

20. A service vehicle comprising a chassis frame supported via spring means by several axles carrying wheels, the axles being carried on the chassis frame by said spring means comprising pressure fluid springs at opposite sides of the vehicle, the pressure fluid springs at one side being connected via a pressure fluid supply system and a load compensator system to the pressure fluid springs associated with the wheels at the other side, an internal tire volume of each of the wheels being connected to the pressure fluid supply system via a tire pressure regulator system, each internal tire volume being associated with a respective regulator valve in the tire pressure regulator system, the tire pressure regulator system comprising relay valves and tire pressure control valves which may be acted upon via separately operated control valve, the tire pressure control valves being placed on the wheels and being equipped with respective shut off elements which interrupt passage through a piping system between the internal tire volume and the associated relay valve via the control valve, the shut off elements having limit means adapted automatically to interrupt if the pressure drops below a minimum tire inflation pressure.

21. A service vehicle for use as a fire-fighting tanker vehicle comprising an uninterrupted chassis frame including two longitudinal bearers, the chassis frame carrying a driver's cab and being supported by four driving axles driven independently of each other by a driving engine, the four driving axles being carried on the chassis frame via pressure fluid springs at opposite sides of the vehicle, the pressure fluid springs associated with wheels at one side being connected via a pressure fluid supply system and a load compensator system to the pressure fluid springs associated with wheels situated at the other side of the vehicle, each of the driving axles being supported in the area of each of the longitudinal bearers of the chassis frame via pairs of said pressure fluid springs arranged one behind another in the direction of travel, an axle casing supported via two longitudinal links arranged in the area of the two longitudinal bearers and one longitudinal link positioned between them and via two transverse links arranged parallel to the driving axle, each of which extends between a central region of the driving axle and a respective one of the longitudianl bearers, and quenching agent tanks and a quenching agent pump arranged on the chassis.

22. A service vehicle for use as a fire-fighting tanker vehicle comprising an uninterrupted chassis frame carrying a driver's cab and supported by four driving axles driven independently of each other by a driving engine, the four driving axles being carried on the chassis frame via pressure fluid springs at opposite sides of the vehicle and the pressure fluid springs associated with wheels at one side are connected via a pressure fluid supply system and a load compensator system to the pressure fluid springs associated with wheels situated at the other side of the vehicle, an automatic transmission situated between front and rear undercarriages each comprising two of said driving axle, measurement senders associated with the pressure fluid springs and one longitudinal bearer coupled via a load equaliser device with the measurement senders, which are associated with the pressure fluid springs at an oppositely situated longitudinal bearer, the measurement senders situated between one driving axle of an undercarriage and the one longitudinal bearer being coupled to the measurement senders situated between the other driving axle of the under carriage and the other longitudinal bearer via lines to a comparator stage of the load equaliser device, and quenching agent tanks and a quenching agent pump arranged on the chassis.

* * * * *